(12) United States Patent
Nguyen et al.

(10) Patent No.: US 10,101,790 B2
(45) Date of Patent: Oct. 16, 2018

(54) LOAD SELECTION FOR RECEIVING POWER FROM A BATTERY MODULE

(71) Applicant: HEWLETT PACKARD ENTERPRISE DEVELOPMENT LP, Houston, TX (US)

(72) Inventors: Hai Ngoc Nguyen, Spring, TX (US); Han Wang, Sugar Land, TX (US); Patrick A. Raymond, Houston, TX (US); Raghavan V. Venugopal, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 92 days.

(21) Appl. No.: 15/116,632

(22) PCT Filed: Mar. 28, 2014

(86) PCT No.: PCT/US2014/032278
§ 371 (c)(1),
(2) Date: Aug. 4, 2016

(87) PCT Pub. No.: WO2015/147884
PCT Pub. Date: Oct. 1, 2015

(65) Prior Publication Data
US 2016/0349822 A1    Dec. 1, 2016

(51) Int. Cl.
*G06F 1/32* (2006.01)
(52) U.S. Cl.
CPC .......... *G06F 1/3212* (2013.01); *G06F 1/3287* (2013.01); *Y02D 10/171* (2018.01); *Y02D 10/174* (2018.01)

(58) Field of Classification Search
CPC . G06F 1/3212; G06F 1/3287; Y02B 60/1282; Y02B 60/1292
See application file for complete search history.

(56) References Cited

U.S. PATENT DOCUMENTS

| 7,340,325 | B2 | 3/2008 | Sousa et al. |
| 8,410,633 | B2 | 4/2013 | Batzler et al. |
| 8,446,040 | B2 | 5/2013 | Paik et al. |
| 2009/0206841 | A1 | 8/2009 | Weng |
| 2011/0049980 | A1* | 3/2011 | Paik .......................... H02J 3/14 307/23 |

(Continued)

FOREIGN PATENT DOCUMENTS

| EP | 1775653 | 4/2007 |
| JP | 2008289302 | 11/2008 |

OTHER PUBLICATIONS

Cisco StackPower: Efficient Use of Power, (Web Page), Mar. 17, 2013, 15 pps. http://www.cisco.com/en/US/prod/collateral/switches/ps5718/ps6406/white_paper_c11-578931.html.

(Continued)

*Primary Examiner* — Terrell S Johnson
(74) *Attorney, Agent, or Firm* — Hewlett Packard Enterprise Patent Department

(57) ABSTRACT

Examples herein disclose determining when a battery module is below a full charge and selecting a subset of loads based on a prioritization among multiple loads. The selected subset of loads is to receive power from the battery module. The examples herein deliver power to the selected subset of loads.

19 Claims, 6 Drawing Sheets

(56) References Cited

U.S. PATENT DOCUMENTS

2013/0038125 A1    2/2013  Feldstein
2013/0067263 A1*  3/2013  Liu .................. H04W 52/0225
                                                        713/340
2013/0346762 A1  12/2013  Hodges
2014/0159495 A1*  6/2014  Nassar .................. H02J 7/0068
                                                         307/71

OTHER PUBLICATIONS

PCT/ISA/KR, International Search Report ISRWROP, Dec. 24, 2014, PCT/US2014/032278.

* cited by examiner

LOAD SELECTION FOR RECEIVING POWER FROM A BATTERY MODULE

BACKGROUND

As reliance on computing systems continues to grow, so does a demand for reliable power and back-up schemes for these computing systems. Servers, for example, may provide architectures for backing up data to memory and providing back-up power sources for powering the back-up data after the loss of power. Back-up power sources may include components such as capacitors and/or batteries.

BRIEF DESCRIPTION OF THE DRAWINGS

In the accompanying drawings, like numerals refer to like components or blocks. The following detailed description references the drawings, wherein.

DETAILED DESCRIPTION

In a backup power system, a primary power supply may support loads until experiencing a failure at which point, a battery module may be designated to support the loads. The battery module may not have sufficient capacity to support the full amount of loads within the backup power system. In this example, if the battery module does not have sufficient capacity, the battery module may shut down for prevention of being overly discharged. In this event, the loads may be dropped until the battery module may be fully charged.

To address these issues, examples disclosed herein provide an intelligent approach to selecting a subset of loads when a battery module may not be fully charged. The examples determine when the battery module is operating below a full charge and selects a subset of loads among multiple loads, the selection of the subset of loads receives power from the battery module. Selecting the subset of loads enables the battery module to support a smaller set of loads from the multiple loads. This leads to an efficient backup power system to prevent the loads from being dropped. Further, the smaller set of loads may be deemed the most critical loads within the backup power system. Providing power to the most critical loads further prevents interruption to the operation of the backup power system.

Additionally, the power system may encounter frequent power outages from the primary power supply. In this manner, the battery module may be frequently used as the backup power source, thus the battery module may not be sufficiently charged in a short period of time. As such, the loads may be prioritized for the selection of the smaller set of loads to receive power from the limited charge on the battery module. Prioritizing the loads ensures the most critical data and/or functioning with the power system may not be lost.

In another example discussed herein, the power system may include multiple battery modules. In this example, a different battery module may suffer a failure within its respective power system. The multiple loads between the multiple battery modules may be reprioritized for selection of the smaller set of loads to receive power from the battery module. This example provides a reinforced power system to ensure the highest priority loads are supported.

In summary, examples disclosed herein provide an intelligent approach to select a smaller subset of loads among multiple loads to receive power from a battery module operating below a full charge. Selecting the subset of loads ensures higher critical loads and/or function with a power system may not be lost.

Figure 1:
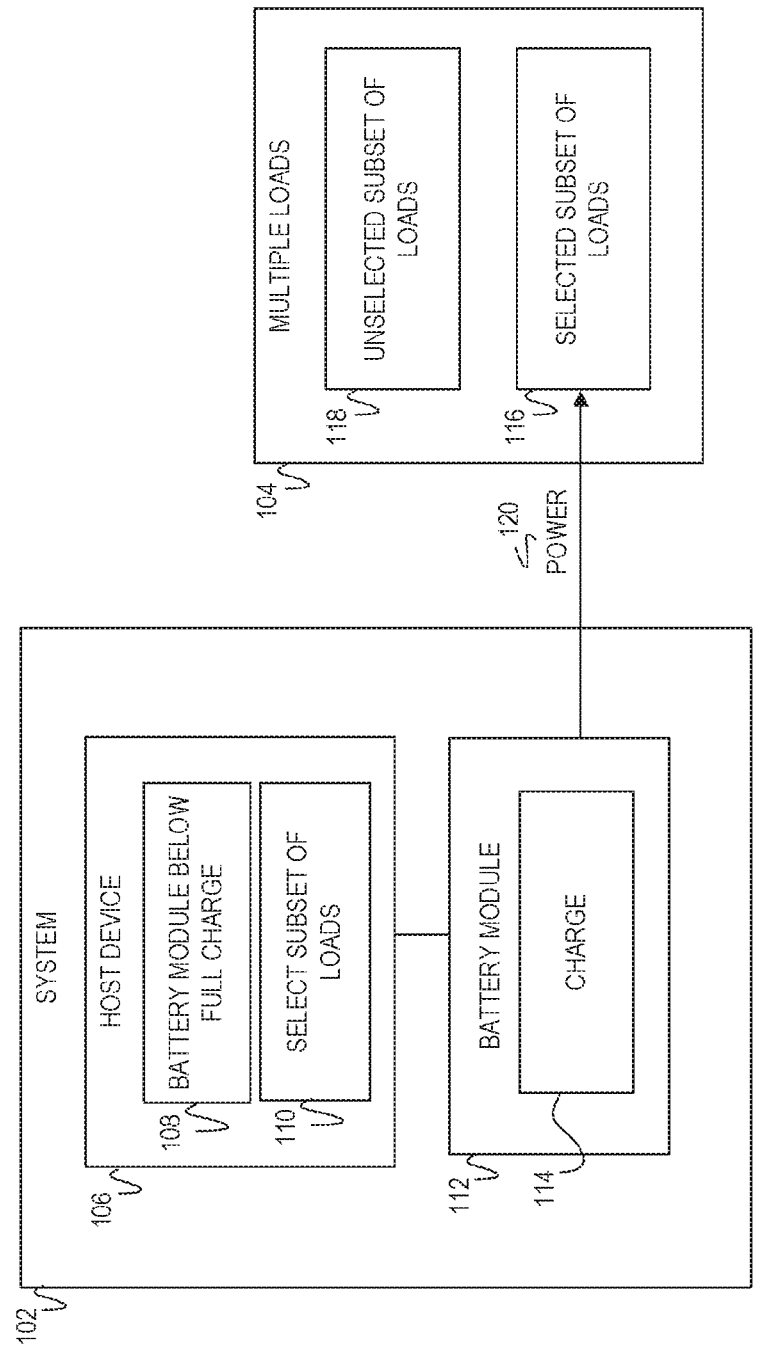
FIG. 1 is a block diagram of an example power system including a host device to determine when a battery module is below a full charge and select a subset of loads based on a prioritization of multiple loads.

Referring now to the figures, FIG. 1 is a block diagram of an example power system 102 to support multiple loads 104. The power system 102 includes a host device 106 to determine when the battery module is below a full charge at module 108 and in turn selecting a subset of loads at module 110 based on a prioritization of the multiple loads 104. The battery module 112 includes the charge 114 as below the full charge and as such delivers power 120 to a subset of selected loads 116 and interrupting power to a subset of unselected loads 118. In this manner, the multiple loads 104 may be prioritized in real-time for when the battery module 112 is below full charging capability. In this implementation, the host device 106 may receive communications from each of the multiple loads 104 in real-time. For example, such communications include the host device 106 collecting load data including a type of load, power ratings of each load, number of loads, etc. Thus, the host device 106 may reclassify each of the multiple loads 104 so a higher priority load may receive power over a lower priority load. In this manner, the host device 106 may support a smaller subset of selected loads 116 among the multiple loads 104 in real-time by taking into account the limited charge 114 on the battery module 112. In another implementation, the power system 102 includes a backup power system in a server. As such, implementations of the power system include a server, power circuit, embedded system, power supply system, computing system, distributed power system, or other type of circuit system capable of providing power to the load. Although FIG. 1 represents the load components 104, 116 and 118 as separate from the system 102, this was done for illustration purposes. For example, the load components 104, 116, and 118 may be included as part of the power system 102. Additionally, FIG. 1 may include additional components not illustrated. For example, the power system 102 may include a bus for communications, common input/output rails to the multiple loads 104, and/or switches to deliver power 120 and/or interrupt the flow of power 120 to the respective loads.

The host device 106, as part of the power system 102, monitors the battery module 112 and the associated charge 114. In this implementation, the host device 106 may determine when the charge 114 is below the full charge capacity. Upon determining the charge 114 is below the full charge capacity of the battery module 112, the host device 106 may separate the multiple loads 104 into those loads which may be deemed critical to the functioning of the system and should receive power 120 from the battery module 112 and those loads which may not be critical to functioning of the system 102 and as such, power 120 may be interrupted. In one implementation, the host device 106 is a type of master device which receives communications from the battery module 112 and the load components 104 and decides how the battery module 112 should prioritize each of the multiple loads 104. Implementations of the host device 106 include a controller, processor, circuit logic, a microchip, chipset, electronic circuit, microprocessor, semi-conductor, microcontroller, central processing unit (CPU), or other device capable determining when the battery module 112 is below the full charge and selecting the subset of loads to receive power 120.

At modules 108 and 110, the host device 106 determines whether the charge 114 of the battery module 112 is below the full charge and based on this determination, the host device 106 selects the subset of loads 116 from the multiple loads 104. The modules 108 and 110 may include an instruction, set of instructions, process, operation, logic, technique, function, firmware, and/or software executable by the host device 106 to determine when the battery module is below the full charge and selecting the subset of loads which is to receive power.

The battery module 112 is an electrical device that converts stored energy into electrical energy to provide the power 120. The charge 114 is a potential difference stored within the battery module 112 which allows the flow of electrons to produce the power 120. In this implementation, to generate the potential difference, the battery module 112 may obtain an input power from a primary power supply (not illustrated). Thus, when the primary power supply fails, the battery module 112 may no longer be charged, thus causing the battery module 112 to act as the backup power source within the system 102. In this implementation, if the primary power supply suffers many power outages, the battery module 112 may never be fully charged. Thus, prioritizing the multiple loads 104 to determine which loads may continue the functioning of the system 102 provides a reinforced and efficient approach to the system 102. In another implementation, the battery module 112 includes a capacitor which stores the charge 114 until reaching a particular charge threshold at which point, current flows between the battery module 112 to deliver the power 120. In this implementation, upon reaching the charging threshold, the capacitor may bleed down until there is no charge (i.e., no potential across the capacitor).

The multiple loads 104 are electrical components associated with the system 102 which may consume power 120 to provide functionality. For example, the multiple loads 104 may include a different battery module, an controller, a memory module, an embedded circuit, etc.

The subset of selected loads 116 are a smaller set of loads selected among the multiple loads 104 which are prioritized to receive the limited power 120. The subset of the selected loads 116 are the loads among the multiple loads 104 in which the host device 106 to selects for receiving the power 120. For example, assume the charge 114 on the battery module 112 may support up to five loads, but there up to seven loads. The host device 106 determines which of the five loads should receive the power 120 based on the type of load, requirement of the load, functional operation of the load within the system 102, and/or whether the load may be critical to the operations of the system 102. In one implementation, the subset of selected loads 116 include a pre-selection among the multiple loads 104 based on the type of load, power requirement of the load, operation of the load, etc. In another implementation, the host device 106 gathers collective information about each of multiple loads 104 in real-time and as such determines the status and operational mode to determine the subset of selected loads 116.

The subset of unselected loads 118 are the loads among the multiple loads 104 which may have power interrupted. In this manner, the subset of unselected loads 118 are de-prioritized which increases the overall efficiency of the system 102. In one implementation, the unselected loads 118 receive power 120 once the battery module 112 is operating at the full charge capacity. In another implementation, the subset of unselected loads 118 may include memory modules while the subset of selected loads 118 may include controllers. This implementation ensures the system 102 may continue operations, even though data may be lost as the memory modules. This implementation is discussed in detail at a later figure.

The power 120 is a flow of electrical charge from the battery module 112 to the multiple loads 104. An amount of the power 120 delivered to the multiple loads 104 is dependent on the charge 114 at the battery module 112. For example, the lesser the charge 114 at the battery module 112, the lesser amount of power 120 which may be delivered to the multiple loads 114. In this manner, the power 120 is constrained by the charge 114 at the battery module 112. Upon the host device 106 determining the charge 114 associated with the battery module 112 is below the full charge, the host device 106 prioritizes the multiple loads 104 to determine which selected subset of loads should receive the limited power 120.

Figure 2:
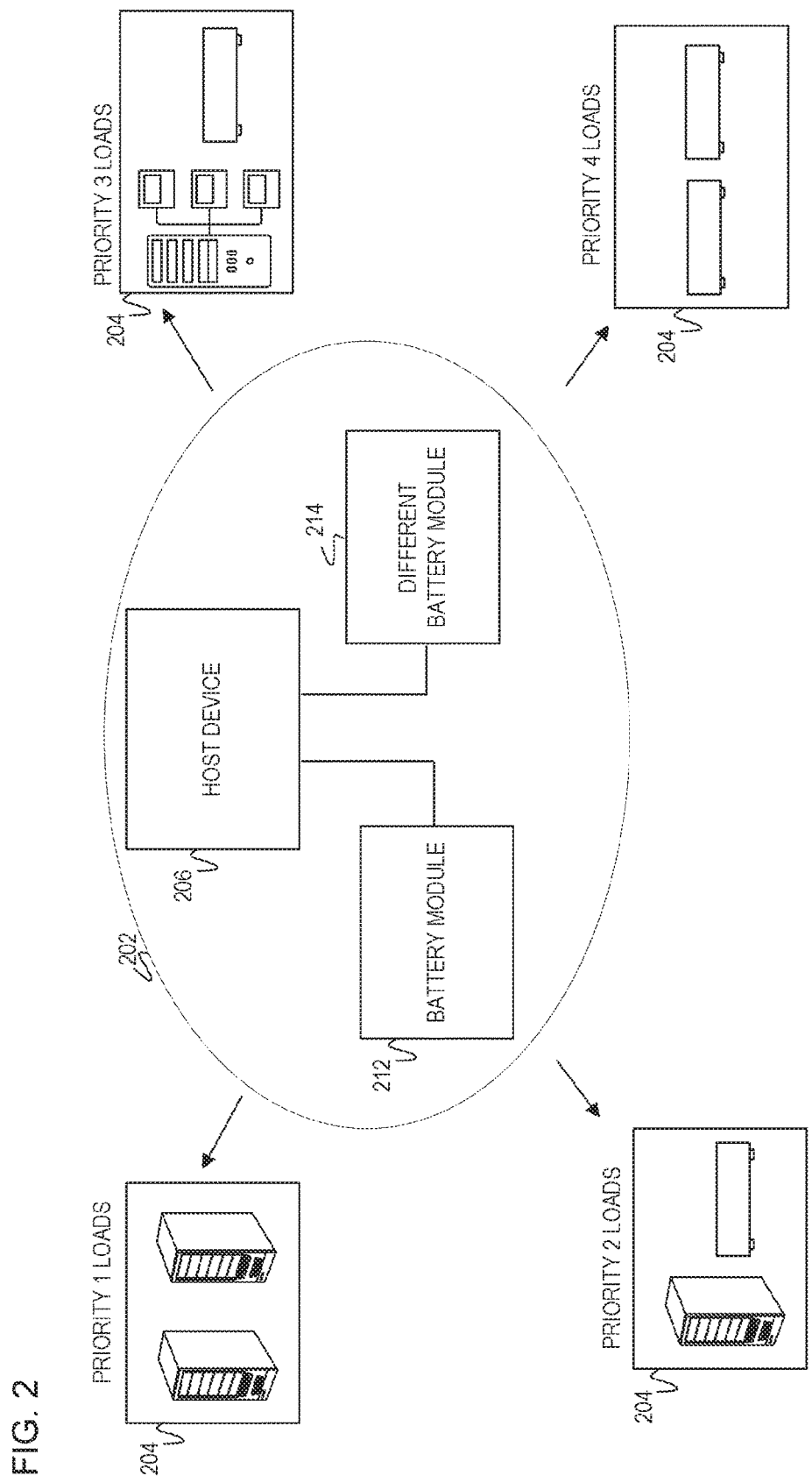
FIG. 2 is a block diagram of an example power system including a host device in communication with a battery module and a different battery module for determining when the battery module has suffered a failure and prioritizing multiple loads between the battery module and the different battery module for a selection of a subset of loads.

FIG. 2 is a block diagram of an example power system 202 including a host device 206 in communication with a battery module 212 and a different battery module 214. The host device 206 may determine when the different battery module 214 may have suffered a failure and as such, may prioritize loads 204 (PRIORITY 1, PRIORITY 2, PRIORITY 3, and PRIORITY 4) for the selection of the subset of loads to receive power from the battery module 212. In one implementation, the power system 202 represents a server system. In this implementation, the battery module 212 may operate as a backup power source to a primary power source (not illustrated). In another implementation, the battery module 212 and different battery module 214 both operate as backup power sources within the server system. In a further implementation, the battery module 212 is part of one server system and the different battery module 214 may operate as a backup power source in another server system. In this implementation, the host device 206 operates as an overview of the loads within each of the server system to coordinate the power delivered to the prioritized loads 204. The power system 202, the host device 206, and the battery module 212 may be similar in structure and functionality to the power system 102, the host device 106, and the battery module 112 as in FIG. 1.

The different battery module 214 may communicate with the host device 206 to identify a status of the different battery module 214. The different battery module 214 may be supporting a smaller set of multiple loads. For example, the different battery module 214 may be supporting PRIORITY 3 and PRIORITY 4 loads, while the battery module 212 may be supporting PRIORITY 1 and PRIORITY 2 loads. The host device 206 may utilize the communications whether the different battery module 214 may suffer the failure. Based upon the determination the different battery module 214 may be suffering the failure, the host device 206 may prioritize the loads 204. In keeping with the previous example, if the different battery module 214 suffers the failure, the host device 206 may prioritize the loads (PRIORITY 1, PRIORITY 2, PRIORITY 3, and PRIORITY 4) for the battery module 212 operating below the full charge to deliver power to a smaller subset of the loads. Although FIG. 2 illustrates the different battery module 214 as part of the power system 102, this was done for illustration purposes and not for limiting implementation purposes. For example, the different battery module 214 may operate as the backup power source within a different server system. In this implementation, FIG. 2 represents a reinforced power system when one of the battery modules 212 and 214 may go offline.

The prioritized loads 204 (PRIORITY 1, PRIORITY 2, PRIORITY 3, and PRIORITY 4) represent the priority of the loads. Prioritizing the loads within the server enables the higher prioritized loads (PRIORITY 1 and PRIORITY 2) to continue receiving power while the lesser prioritized loads (PRIORITY 3 and PRIORITY 4) may receive an interruption of power. This conserves power within the server to enable a more efficient approach to avoid failure and/or over-discharging of the battery module 212. In another implementation, components within each of the prioritized loads (PRIORITY 1, PRIORITY 2, PRIORITY 3, and PRIORITY 4) may be prioritized for the selection of the subset of loads. For example, assume the battery module 212 may provide power to the components with PRIORITY 1 loads 204 and may have enough charge capacity to cover one of the components in PRIORITY 2 loads. In this example, the battery module 212 may support the file server component while dropping the memory module component.

Figure 3:
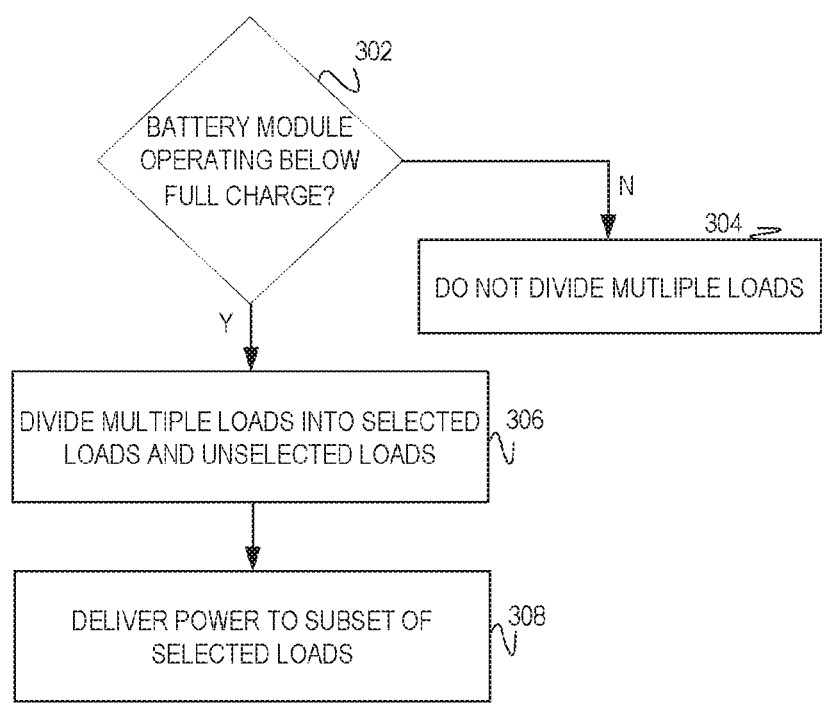
FIG. 3 is a flowchart of an example method of monitoring a battery module charge status for a determination of when the battery module may be operating below a full charge, the example method selects loads among multiple loads to receive power from the battery module operating below the full charge.

FIG. 3 is a flowchart of an example method executable by a host device for determining when a battery module may be operating below a full charge. Based on the determination the battery module is below the full charge, the host device divides multiple loads into subsets of selected and unselected loads. The host device signals to the battery module to deliver power to the subset of selected loads. In one implementation, the battery module operates as a backup power source within a system, thus the host device selects particular loads among multiple loads which are to receive power. In this implementation, the selected particular loads are to continue receiving power, while the unselected loads are to receive power once more the battery module may be fully charged. In another implementation, FIG. 3 represents the situation where the system may encounter frequent power outages. In this manner, the battery module may be frequently used as the backup source, thus the battery module may not be sufficiently charged in a short period of time. As such, the host device may prioritize the loads for selecting which loads are to receive power from the limited charge on the battery module. Prioritizing the loads ensures the most critical data and/or functioning with the system may not be lost. In discussing FIG. 3, references may be made to the components in FIGS. 1-2 to provide contextual examples. For example, the host device 106 as in FIG. 1 executes operations 302-308 to determine when the battery module is below the full charge and delivering power to the subset of selected loads based on the prioritization of multiple loads. In another example, a controller associated with a power system as in FIGS. 1-2 executes operations 302-308. Further, although FIG. 3 is described as implemented by the computing device, it may be executed on other suitable components. For example, FIG. 3 may be implemented in the form of executable instructions on a machine-readable storage medium 604 as in FIG. 6.

At operation 302, the host device monitors the battery module for the determination of when the charge status of the battery module is below the full charge. In one implementation, the battery module may be charging prior to determining the charge of the battery module. In this implementation, the battery module may not have had enough time to fully charge, thus the host device may adjust the overall load to subsidize the limited charge on the battery module. In another implementation, the host device may track the level of charge at the battery module through a sensing circuit. In a further implementation, the battery module may communicate the level of charge to the host device. Yet, in an additional implementation, the host device may calculate the level of charge at the battery module. In this implementation, the host device may track the period of time for the battery module to charge and as such, may calculate the level of charge. Upon the determination the battery module is not below the full charge or in alternate is at the full charge, the host device may proceed to operation 304 and does not select the subset of loads. Upon the determination the battery module is below the full charge, the host device may proceed to operation 306 to divide the multiple loads into the subset of selected loads.

At operation 304, the host device does not select the loads among the multiple loads. In one implementation, the host device may continue monitoring the charge status of the battery module. In another implementation, if the host device determines the battery module is not below the full charge, the battery module may be at a full charge and as such may be capable of handling the multiple loads within the system. In a further implementation, a primary source of the system may be supporting the multiple loads, thus the battery module may not designated as the backup power source to handle the multiple loads.

At operation 306, the multiple loads are divided into the subset of selected and unselected loads. Operation 306 may include prioritizing and/or ranking the loads, thus the higher prioritized and/or ranked loads may receive the power from the limited charge battery module. In this implementation, prioritizing the loads prevents loss of the most critical and/or functioning of the system. In one implementation, the host device may preselect the backup loads which are to receive power in the situation the power may be limited. In another implementation, the host device may receive communications from each of the loads in real-time. The communications may include collection information about each of loads. Such collective information may include the type of load, the power rating of the load, power needs of the load, the number of loads, etc. In this manner, the host device may support the multiple loads in real-time taking into account the limited charge on the battery module. In a further implementation operation 306 includes the host device adding, removing, and/or isolation the loads in real time from a list of the multiple loads. Thus, the host device may determine the more critical loads of the system to continue power and other less critical loads for interrupting power. This creates a more efficient use of the limited power from the battery module.

At operation 308, the host device signals to the battery module to deliver power to the subset of selected loads. Operation 308 may include the host device transmitting a signal to the battery module to deliver power to the subset of selected loads. In this implementation, the host device may transmit the various address locations of each of the selected loads to the battery module. In another implementation, the host device may transmit a signal to connect or disconnect a switch to the corresponding load. In a further implementation, the host device may interrupt the flow of power to the unselected loads.

Figure 4:
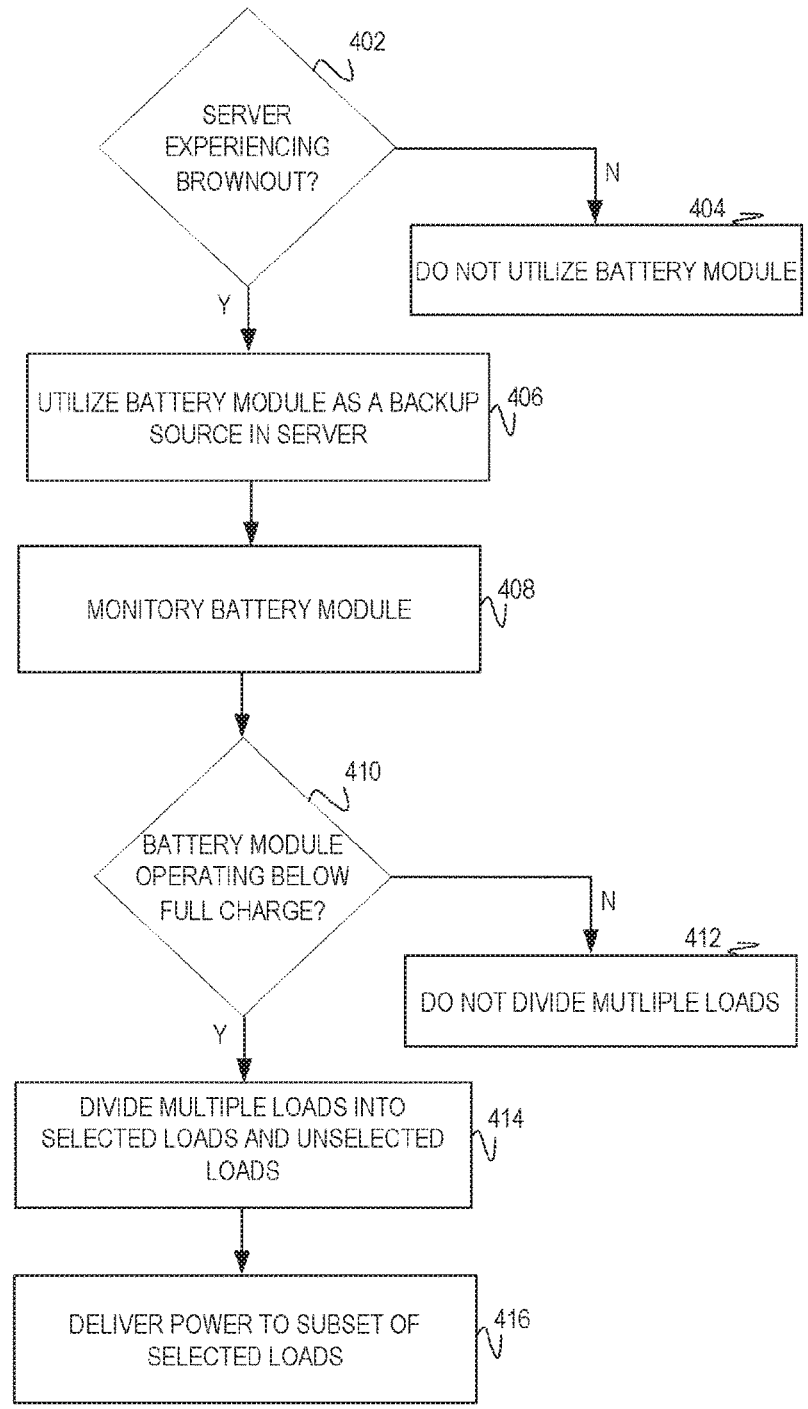
FIG. 4 is a flowchart of an example method to determine when a server experiences a brownout to utilize a battery module operating below full charge as a backup source in the server, the example method delivers power from the battery module to a selected subset of loads within the server.

FIG. 4 is a flowchart of an example method executable by a host device for determining when a server experiences a brownout and utilizing a battery module operating below full charge as a backup power source in the server. Upon designation the battery module as the backup power source, the host device may divide multiple loads within the server into selected and unselected loads. The selected loads in turn receive power from the battery module to ensure functioning of the server. The brownout in the server is a drop in voltage in a power supply supporting multiple loads within the server. The brownout may last for a period of time, as opposed to voltage sag which may be intermittent. Utilizing the battery module as the backup power source during the brownout, increases robustness of the server in case the power supply may fail. Prior to the designation as the backup source, the battery module continue charging however, if the battery does not have a full charge, the host device may pick and choose which loads to support with the limited battery charge. In discussing FIG. 4, references may be made to the components in FIGS. 1-2 to provide contextual examples. For example, the host device 106 as in FIG. 1 executes operations 402-416 to determine when the battery module is below the full charge and delivering power to the subset of selected loads based on the prioritization of multiple loads. In another example, a controller associated with a power system as in FIGS. 1-2 executes operations 402-416. Further, although FIG. 4 is described as implemented by the computing device, it may be executed on other suitable components. For example, FIG. 4 may be implemented in the form of executable instructions on a machine-readable storage medium 604 as in FIG. 6.

At operation 402, the host device determines whether the server is experiencing the brownout situation. The host device may monitor the primary power supply to the server and monitor when the primary power supply has dropped in voltage over a period of time. In one implementation, the host device may determine the server is experiencing the brownout upon the drop in the voltage of primary power supply which may last upon a threshold period of time. Upon determining the server is experiencing the brownout, the host device may proceed to designate the battery module as the backup power source as at operation 406.

At operation 404, upon determining the host device is not experiencing the brownout, the host device does not utilize the battery module. This indicates the server is not experiencing the brownout situation meaning the primary power supply is capable of handling the multiple loads within the server.

At operation 406, the host device utilizes the battery module as the backup power source in the server. Operation 406 may include monitoring the battery module and transmitting a signal to the battery module for providing power to the multiple loads within the server. Utilizing the battery module as the backup power source provides a reinforced power system within the server.

At operation 408, the host device monitors the battery module. In one implementation, the battery module may include a sensing circuit which may transmit information to the host device indicating the level of charge at the battery module. In another implementation, the battery module tracks the level of charge for communication to the host device. In a further implementation, the host device may calculate the level of charge at the battery module. In this implementation, the host device may track the period of time for the battery module to charge and as such, may calculate the level of charge.

At operation 410, the host device determines whether the battery module is operating the below the full charge. In one implementation, the battery module may be charging prior to determining the charge of the battery module. In this implementation, the battery module may not have had enough time to fully charge, thus the host device may adjust the overall load to subsidize the limited charge on the battery module. Operation 410 may be similar in functionality to operation 302 as in FIG. 3.

At operation 412, the host device does not divide the multiple loads into selected and unselected loads. As an alternate, operation 412 may determine the battery module is operating at the full charge. This may indicate the battery module is capable of providing power to the multiple loads as the battery module is may not be limited in power. Operation 412 may be similar in functionality to operation 304 as in FIG. 3.

At operation 414, the host device divides the multiple loads in the server into selected and unselected loads. Operation 414 may include prioritizing each of the multiple loads based on the charge status of the battery module. The host device may determine which loads to turn on and off within the server. As such, the host device may obtain collective information about the number of loads, type of loads, load capacity, etc. In this manner, the host device may decide which loads to turn on and off to ensure functioning of the server. In one implementation, the host device may prioritize a controller over a memory module. In this implementation, the server may continue operations, but lose other functions which are chosen by the host device to not receive power from the battery module. Operation 414 may be similar in functionality to operation 308 as in FIG. 3.

At operation 416, the battery module delivers the power to the selected set of loads from operation 414. The host device may transmit a signal to the battery module including the various address locations of each of the loads. In another implementation, the host device may transmit a signal to a switch for connection and/or disconnection to the corresponding load. Operation 416 may be similar in functionality to operation 310 as in FIG. 3.

Figure 5:
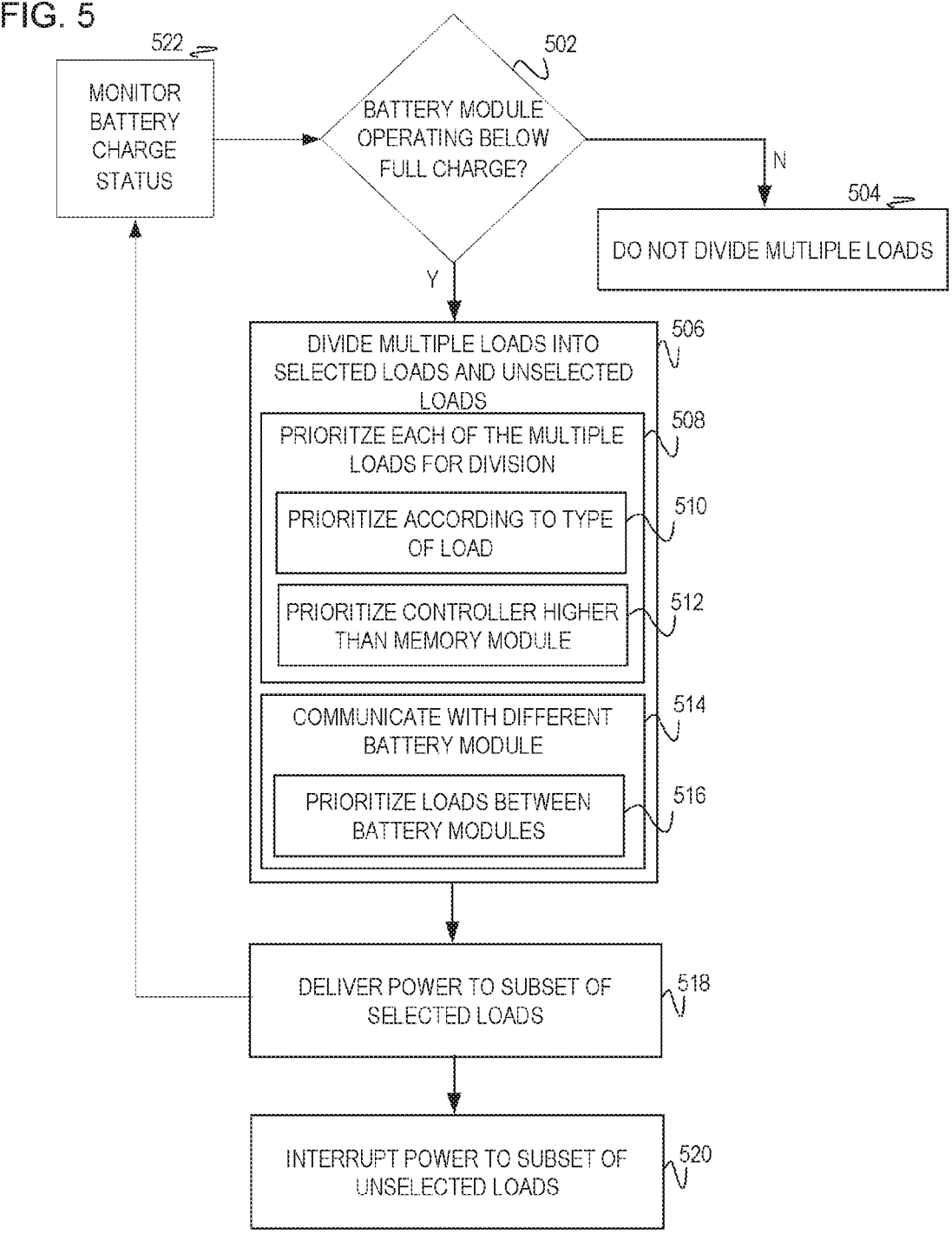
FIG. 5 is a flowchart of an example method to monitor a battery module status for determining when the battery module is operating below a full charge and selecting a subset of loads among multiple loads based a prioritization according to a type of load and between multiple battery modules.

FIG. 5 is a flowchart of an example method executable by a host device for monitoring a battery module status and determining when the battery module is operating below a full charge. Based on the determination the battery module is operating below the full charge, the method may proceed to divide multiple loads into selected and unselected loads. Dividing the multiple loads may include prioritizing each of the multiple loads according to a type of load. In this implementation, a controller may rate in higher priority than a memory module. In another implementation, dividing the multiple loads may include the host device communicating with a different battery module and determining the different battery module may be close to suffering a failure. The battery module and the different battery module may be considered two different back up power sources within a system. Additionally, In this implementation, the host device may prioritize the multiple loads between both the battery module and the different battery module to distribute power from the battery module to the higher prioritized items. Upon dividing the multiple loads into selected and unselected loads, the host device may signal to the battery module to deliver power to the subset of selected loads and interrupting power to the subset of unselected loads. In one implementation, the method of FIG. 5 may occur in a server. In this implementation, the server may experience a brownout in power and thus designate the battery module as the backup power source to the multiple loads. The brownout may include an intentional or unintentional drop in power within the server. For example, the brownout may include a primary power supply losing power, thus to avoid interruption to the server, the battery module may operate as the backup source. In this example, the battery module may be charging, but may not have achieved its full charge. Prioritizing the loads within the server enables the higher prioritized loads to continue receiving power while the lesser prioritized loads may receive an interruption of power. This conserves power within the server to enable a more efficient approach to avoid failure within the server. In discussing FIG. 5, references may be made to the components in FIGS. 1-2 to provide contextual examples. For example, the host device 106 as in FIG. 1 executes operations 502-522 to determine when the battery module is below the full charge and delivering power to the subset of selected loads based on the prioritization of multiple loads. In another example, a controller associated with a power system as in FIGS. 1-2 executes operations 502-522. Further, although FIG. 5 is described as implemented by the computing device, it may be executed on other suitable components. For example, FIG. 5 may be implemented in the form of executable instructions on a machine-readable storage medium 604 as in FIG. 6.

At operation 502, the host device determines whether the battery module is below the full charge. In one implementation, the host device may collect information from a sensing circuit at the battery module to determine when the battery module is below the full charge. In another implementation, the battery module may communicate the status of the charge level at the battery module. In a further implementation, the battery module serves as the backup power source within the server system. In this implementation, if the server system experiences frequent power outages, the battery module may not have the opportunity to reach its full charge as the battery module may be switching to supply power frequently during the outages. As such, the host device may track a time period to determine the level of charge of the battery module. For example, the host device may use a calculation to determine how the length of time for the battery module to reach its full charge. Operation 502 may be similar in functionality to operations 302 and 410 as in FIGS. 3-4.

At operation 504, upon determining battery module is not below the full charge, the host device does not select the loads from the multiple loads. This may indicate the battery module is operating at full capacity, thus the battery module may be able to fully support the loads making prioritizing each load unnecessary. Operation 504 may be similar in functionality to operations 304 and 412 as in FIGS. 3-4.

At operation 506, the host device divides multiple loads into the selected loads and the unselected loads. Operation 506 may include selecting the subset of selected loads from the multiple loads. The selected loads are the loads are a smaller set of loads among the multiple loads which are to receive power from the battery module as the battery module is limited on an amount of power it may output to the loads. In one implementation of operation 506, the host device may proceed to operations 510-512 to prioritize each load according to the type of load. In this implementation, a controller may be considered a higher priority than a memory module. In another implementation of operation 506 the method may proceed to operations 514-516 to communicate with a different battery that may suffer or close to suffering a failure. In this implementation, the host device may dynamically prioritize the multiple loads between the battery module and the different battery module so the battery module may deliver power to the higher priority loads between the battery modules. Operation 506 may be similar in functionality to operations 306 and 414 as in FIGS. 3-4.

At operation 508, the host device prioritizes each of the multiple loads for the division between selected and unselected loads. The prioritization is a rank that may occur at the host device. In this implementation, the host device may collect data on each of the multiple loads within the system to identify the controller from the battery module and other type of components. Operation 508 enables the host device to respond pro-actively when the battery module is below the full charge. In one implementation, the prioritization of each of the multiple loads may be prioritized according the type of load as at operation 510. In another implementation, each of the multiple loads is prioritized to whether it may include the controller and/or the memory module such as at operation 512.

At operation 510, the host device prioritizes each of the multiple loads according to the type of load. The type of load is a particular load which may share a characteristic with another load that may cause both loads to be grouped together. For example, the type of load may include the type of hardware. In this example, the type of hardware may include a processor, the controller, the memory module, or other such types of hardware within the server. In one implementation, the host device prioritizes the controller higher than the memory modules as at operation 512.

At operation 512, the host device prioritizes the controller as a higher priority than the memory module. Ranking the controller as higher in priority ensures the system may continue functional operation, while the memory module storing data may lose power. In this implementation, the host device places the functional operation before the storing data. Operation 512 may include prioritizing multiple controllers higher in priority than multiple memory modules. In another implementation, each of the multiple controllers are prioritized in the order each controller communicates with the host device. For example, the host device may prioritize one of the multiple controllers as higher in priority than the other multiple controllers if the one of the multiple controllers communicates to the host device before the other multiple controllers.

At operation 514, the host device communicates with a different battery module. Communicating with the different battery module, the host device may determine if the different battery module may be in failure mode or close interrupting the power provided to the loads in the server. In this implementation each of the battery modules may support a respective server. Communicating with the host device between the multiple battery modules supports the situation when one of the battery modules goes offline and prioritizing the loads between multiple servers to prevent interruption of one of the servers. Operation 514 provides a reinforced power source to support the prioritized loads between both battery modules.

At operation 516, the host device prioritizes the loads between the multiple battery modules. Operation 516 enables the ranking among the loads between the various servers to ensure the servers maintain operation.

At operation 518, the battery module operating below the full charge delivers power to the subset of loads selected at operation 506. The host device may signal to the battery module upon prioritizing the loads at operations 506-512 to deliver the power to the selected loads. In one implementation, the host device may transmit the address location of each selected load within the server for the battery module to deliver power. In another implementation, the host device may transmit a signal to a switch for connecting to the selected loads thus continuing the flow of power to the selected loads. Operation 518 may be similar in functionality to operations 310 and 416 as in FIGS. 3-4.

At operation 520, the host device interrupts power to the subset of unselected loads. In one implementation, the host device may signal to a switch to disconnect, thus interrupting the flow of power from the battery module to the unselected loads. The unselected loads are among the multiple loads in which the host device determines are not as high of a priority as the selected set of loads. In this manner, the host device may dynamically adjust the contribution of loads from the battery module, therefore accounting for the loss in the full charge.

At operation 522, upon delivering power to the subset of selected loads, the host device may continue monitoring the battery charge status. At this operation, the host device may determine if the battery module continues losing charge to dynamically adjust the priority of the loads.

Figure 6:
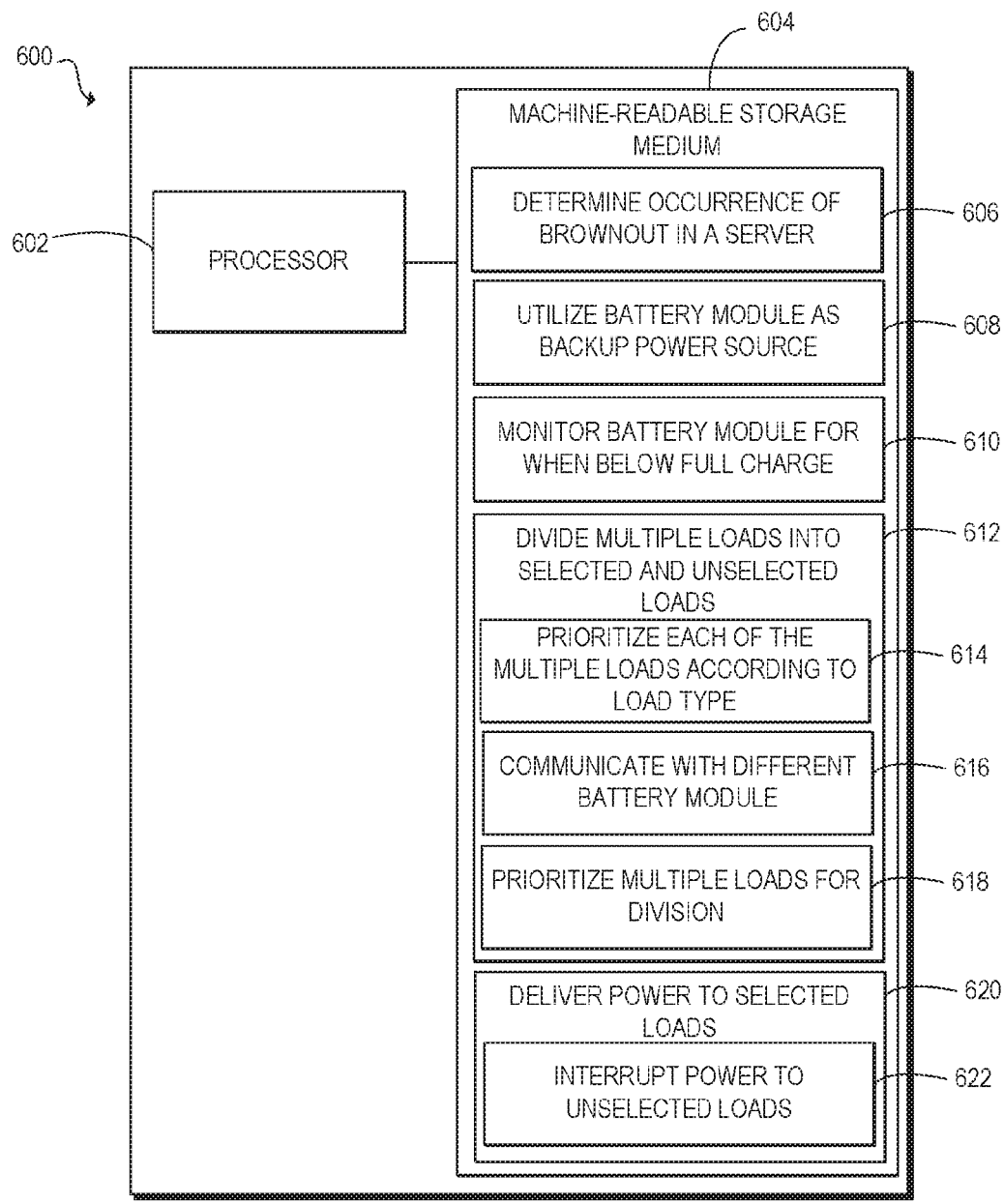
FIG. 6 is a block diagram of an example computing device with a processor to execute instructions in a machine-readable storage medium for determining an occurrence of a brownout within a server and prioritizing multiple loads within the server for a selection of loads to receive power from a battery module operating below a full charge.

FIG. 6 is a block diagram of computing device 600 with a processor 602 to execute instructions 606-622 within a machine-readable storage medium 604. Specifically, the computing device 600 with the processor 602 is to determine an occurrence of a brownout within a server and prioritizing multiple loads within the server for a selection of loads to receive power from a battery module operating below a full charge. Although the computing device 600 includes processor 602 and machine-readable storage medium 604, it may also include other components that would be suitable to one skilled in the art. For example, the computing device 600 may include the battery module 112 as in FIG. 1. The computing device 600 is an electronic device with the processor 602 capable of executing instructions 606-622, and as such embodiments of the computing device 600 include a mobile device, client device, personal computer, desktop computer, laptop, tablet, video game console, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-622 for determining the occurrence of the brownout in the server and utilizing the battery module operating below the full charge as a backup power source in the server for delivering power to a selected subset of loads within the server. In one implementation, upon executing instructions 606-610, the processor 602 may execute instruction 612 by executing any one or combination of instructions 614-618. In another implementation upon executing instruction 612 and/or combination of instructions 614-618, the processor 602 may execute instructions 620-622. Specifically, the processor 602 executes instructions 606-610 to: determine the occurrence of the brownout in the server, utilize a battery module as a backup power source within the server, and monitor the battery module for determining when the battery module is operating below the full charge. The processor 602 may then execute instruction 612 through one or combination of instructions 614-618. Specifically, the processor 602 executes instructions 612-618 to: divide multiple loads into selected loads and unselected loads based on a prioritization of the multiple loads; prioritize each of the multiple loads according to a load type, such as a controller may have a higher priority than a memory module; communicating with a different battery module based on a determination the different battery module has suffered a failure; and prioritizing the multiple loads between the battery module and the different battery module for the selection of the selected and unselected loads. The processor 602 may then execute instructions 620-622 to delivery power to the selected loads while also interrupting power to the unselected loads.

The machine-readable storage medium 604 includes instructions 606-622 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide an intelligent approach to select a smaller subset of loads among multiple loads to receive power from a battery module operating below a full charge. Selecting the subset of loads ensures higher critical loads and/or function with a power system may not be lost.

We claim:

1. A system comprising:
a host device, coupled to a data center, to:
determine that a battery module is below a full charge;
prioritize multiple loads within the data center in real-time; and
based on the prioritization of the multiple loads within the data center, select a subset of loads that should receive power from the battery module; and
the battery module, coupled to the host device, to deliver the power to the selected subset of loads.

2. The system of claim 1 wherein:
the host device further determines that the system is experiencing a brownout; and in response to the determination that the system is experiencing a brownout, the battery module further serves as a backup power source to the multiple loads during the brownout.

3. The system of claim 1 wherein the host device is to monitor the battery module.

4. The system of claim 1 wherein to prioritize the multiple loads within the data center, the host device is to:
classify a controller in higher priority than a memory module;
in response to the determination there are multiple controllers, classify each of the multiple controllers according to an order of communication to the host device.

5. The system of claim 1 comprising:
a different battery module, coupled to the host device, to communicate with the host device; and
the host device is to:
determine that the different battery module has suffered a failure;
in response to the determination that the different battery module has suffered the failure, prioritize loads between both the different battery module and the battery module;
select among the loads between both the different battery module and the battery module a subset of loads that should receive the power from the battery module; and
the battery module is to serve as a backup power module to the different battery module for the delivery of power to the selected subset of loads.

6. The system of claim 1 wherein based on the prioritization of the multiple loads within the data center, select the subset of loads that should receive power from the battery module, the host device is to:
identify a set of loads among the multiple loads that were unselected to receive the power from the battery module; and
interrupt the power to the identified set of loads.

7. The system of claim 6 wherein the host device is to:
determine that the battery module has a full charge; and
in response to the determination that the battery module has a full charge, continue the power to the identifies set of loads that were identified as unselected.

8. The system of claim 1 wherein to prioritize the multiple loads within the data center, the host device is to:
prioritize a server higher than a memory module.

9. A non-transitory machine-readable storage medium comprising instructions that when executed by a processor cause a computing device to:
determine that a battery module is below a full charge via monitoring the battery module;
in response to the determination that the battery module is below the full charge, prioritize multiple loads within a data center in real-time;
based on the prioritization of the multiple loads within the data center, identify a subset of loads that should receive power from the battery module; and
deliver power from the battery module to the subset of loads within the data center.

10. The non-transitory machine-readable storage medium including the instructions of claim 9, wherein to deliver power from the battery module to the subset of loads within the data center is further comprising instructions that when executed by the processor cause the computing device to:
interrupt power to a set of unselected loads among the multiple loads.

11. The non-transitory machine-readable storage medium including the instructions of claim 10, wherein to prioritize the multiple loads within the data center and deliver power to the selected loads occur during a brownout and is further comprising instructions that when executed by the processor cause the computing device to:
determine an occurrence of the brownout in a server prior to monitoring the battery module; and
utilize the battery module as a backup power source in the server.

12. The non-transitory machine-readable storage medium including the instructions of claim 10 wherein to prioritize the multiple loads within the data center comprises instructions that when executed by the processor cause the computing device to:
communicate with a different battery module for determination the different battery module has suffered a failure; and
prioritize the multiple loads between the different battery module and the battery module into a division of the multiple loads into selected loads and unselected loads, wherein the battery module serves as a backup power module to the different battery module for delivery of the power to the selected loads.

13. The non-transitory machine-readable storage medium including the instructions of claim 10, wherein to prioritize the multiple loads within the data center comprises instructions that when executed by the processor cause the computing device to:
prioritize each of the multiple loads according to a type of load, wherein a controller is higher in priority than a memory module and further wherein if there are multiple controllers, each controllers is prioritized according to consecutive communication.

14. A method comprising:
determining that a battery is operating below a full charge;
prioritizing multiple loads within a data center into a subset of selected loads and of unselected loads in real-time; and
delivering power to the subset of selected loads.

15. The method of claim 14 further comprising:
interrupting power to the subset of unselected loads among the multiple loads.

16. The method of claim 14 wherein the method occurs during a brownout and the battery module is a backup power source in a server during the brownout.

17. The method of claim 14 wherein prioritizing multiple data loads within the data center in real-time into the subset of selected loads further comprises:
prioritizing each of the multiple loads according to a type of load, wherein a controller type load has a higher rated priority than a memory module load.

18. The method of claim 14 wherein a charge of the battery module decreases over time further dropping below the full charge.

19. The method of claim 14 comprising:
re-prioritizing the multiple loads into a different set of selected loads and a different set of unselected loads; and
delivering power to the different set of selected loads.

* * * * *